United States Patent
Bostick et al.

(10) Patent No.: US 10,845,885 B2
(45) Date of Patent: Nov. 24, 2020

(54) OBJECT SCROLLING AND SELECTION ON A WEARABLE COMPUTING DEVICE

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 174 days.

(21) Appl. No.: 15/443,302

(22) Filed: Feb. 27, 2017

(65) Prior Publication Data
US 2018/0246577 A1   Aug. 30, 2018

(51) Int. Cl.
| | | |
|---|---|---|
| *G06F 17/00* | (2019.01) | |
| *G06F 3/01* | (2006.01) | |
| *G06F 1/16* | (2006.01) | |
| *G06F 3/0485* | (2013.01) | |
| *G06F 3/0482* | (2013.01) | |
| *G06F 3/0346* | (2013.01) | |

(52) U.S. Cl.
CPC ............. *G06F 3/017* (2013.01); *G06F 1/163* (2013.01); *G06F 1/1694* (2013.01); *G06F 3/0346* (2013.01); *G06F 3/0482* (2013.01); *G06F 3/0485* (2013.01)

(58) Field of Classification Search
CPC ...................................................... G06F 1/163
See application file for complete search history.

(56) References Cited

U.S. PATENT DOCUMENTS

| | | | | |
|---|---|---|---|---|
| 8,451,246 B1 * | 5/2013 | Scholler | ............. | G06F 3/04883 345/173 |
| 2010/0295773 A1 * | 11/2010 | Alameh | ............. | H03K 17/9631 345/156 |

(Continued)

FOREIGN PATENT DOCUMENTS

| | | |
|---|---|---|
| CN | 103558918 | 2/2014 |
| CN | 103777752 | 5/2014 |

(Continued)

OTHER PUBLICATIONS

Courtney Jespersen, "Fitbit Blaze vs. Apple Watch Sport: How Does the new Fitbit Stack up", NPL, pp. 1-11, dated: Jan. 8, 2016, <https://www.nerdwallet.com/blog/shopping/fibit-blaze-vs-apple-watch-sport-smartwatch-comparison/> (Year: 2016).*

(Continued)

*Primary Examiner* — Mustafa A Amin
(74) *Attorney, Agent, or Firm* — Jay Wahlquist; Andrew D. Wright; Roberts, Calderon, Safran & Cole, P.C.

(57) ABSTRACT

A computer-implemented method includes identifying, by a wearable computing device, extremity position of a user wearing the wearable computing device based on monitoring the sensor data gathered by a sensor suit implemented by the wearable computing device; identifying, by the wearable computing device, a matrix cell corresponding to the extremity position; and selecting, by the computing device, an object corresponding to the matrix cell.

20 Claims, 9 Drawing Sheets

(56) References Cited

U.S. PATENT DOCUMENTS

| | | | |
|---|---|---|---|
| 2014/0028546 A1* | 1/2014 | Jeon | G06F 3/014 345/156 |
| 2014/0055352 A1* | 2/2014 | Davis | G06F 3/017 345/156 |
| 2015/0177847 A1* | 6/2015 | Swartz | G06F 3/0219 345/168 |
| 2015/0309582 A1 | 10/2015 | Gupta | |
| 2016/0070441 A1* | 3/2016 | Paek | G10L 25/48 715/773 |
| 2016/0091980 A1 | 3/2016 | Stromgaard et al. | |
| 2016/0202665 A1 | 7/2016 | Park | |
| 2016/0253044 A1* | 9/2016 | Katz | G06F 3/017 345/156 |
| 2017/0065224 A1* | 3/2017 | Rahko | A61B 5/7435 |

FOREIGN PATENT DOCUMENTS

| | | |
|---|---|---|
| CN | 104917878 | 9/2015 |
| CN | 105045391 | 11/2015 |

OTHER PUBLICATIONS

Lecher, "Wristband Tracks Your Muscle Movements for Super-Precise Gesture Controls", http://www.popsci.com/gadgets/article/2013-02/gesture-control-all-your-gadgets-awesome-wristband, Popular Science, Feb. 25, 2013, 1 page.

Xu et al, "Finger-writing with Smartwatch: A Case for Finger and Hand Gesture Recognition using Smartwatch", http://dl.acm.org/citation.cfm?id=2699350, ACM Digital Library, ISBN: 978-1-4503-3391-7, Feb. 12-13, 2015, 6 page.

\* cited by examiner

|  | Finger 1 | Finger 2 | Finger 3 |
|---|---|---|---|
| Position 1 | _Object 1_ | Object 2 | Object 3 |
| Position 2 | Object 4 | Object 5 | Object 6 |
| Position 3 | Object 7 | Object 8 | Object 9 |

FIG. 4

OBJECT SCROLLING AND SELECTION ON A WEARABLE COMPUTING DEVICE

BACKGROUND

The present invention generally relates to scrolling through objects and selecting objects and, more particularly, to scrolling through objects and selecting objects on a wearable computing device.

A wearable computing device (e.g., a smart watch, a smart fitness band, or the like) may include a touch-screen display via which virtual objects may be selected. Accurate selection of virtual objects, such as applications, characters on a virtual keyboard, etc., can be difficult since the display on the wearable computing device is relatively small compared to a user's finger. Manufacturers of certain wearable computing devices often disable certain features, such as virtual keyboards, as selection of characters on the virtual keyboards can be difficult and inaccurate.

SUMMARY

In an aspect of the invention, a computer-implemented method includes: identifying, by a wearable computing device, extremity position of a user wearing the wearable computing device based on monitoring the sensor data gathered by a sensor suit implemented by the wearable computing device; identifying, by the wearable computing device, a matrix cell corresponding to the extremity position; and selecting, by the computing device, an object corresponding to the matrix cell.

In an aspect of the invention, there is a computer program product for selecting objects on a wearable computing device without touch inputs. The computer program product comprises a computer readable storage medium having program instructions embodied therewith, the program instructions executable by the wearable computing device to cause the wearable computing device to: identify a matrix cell corresponding to values of the sensor data by monitoring sensor data gathered by a sensor suite implemented by the wearable computing device; and select an object corresponding to the identified matrix cell.

In an aspect of the invention, a system includes: a CPU, a computer readable memory and a computer readable storage medium associated with a wearable computing device; program instructions to detect a wake gesture based on monitoring sensor data gathered by a sensor suite implemented by the wearable computing device; program instructions to present a menu of objects based on the detecting the wake gesture; program instructions to identify a scroll gesture based on the monitoring the sensor data; program instructions to scroll through objects within the menu and display the scrolling on the wearable computing device based on detecting the scroll gesture; program instructions to detect a selection gesture based on the monitoring the sensor data; and program instructions to select a current object in the menu based on detecting the selection gesture. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 4 shows an example matrix of objects from which objects may be selected via extremity position gestures in accordance with aspects of the present invention.

DETAILED DESCRIPTION

Figure 1:
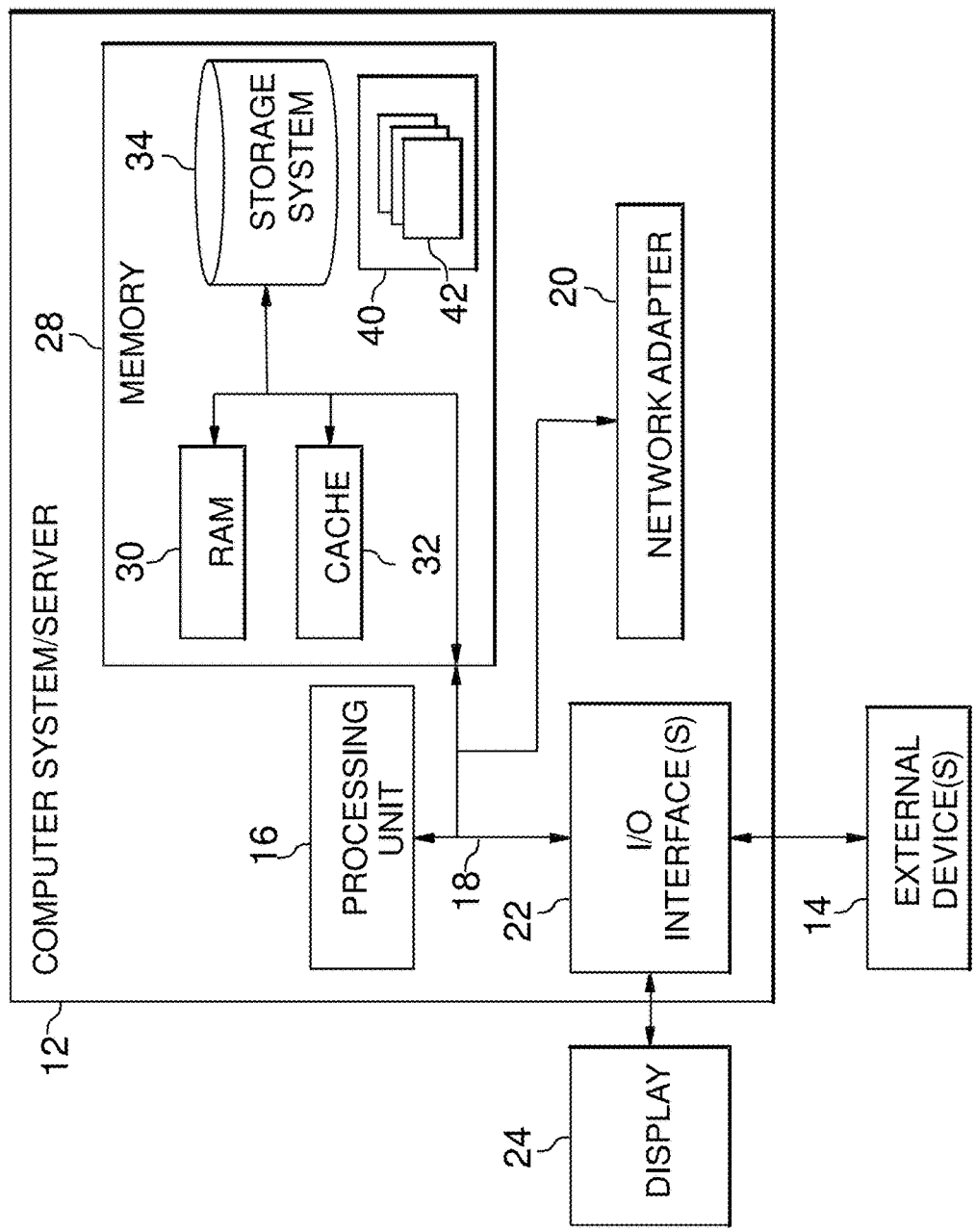
FIG. 1 shows an illustrative environment for managing the processes in accordance with aspects of the invention.

The present invention generally relates to scrolling through objects and selecting objects and, more particularly, to scrolling through objects and selecting objects on a wearable computing device. Aspects of the present invention may include a wearable computing device (e.g., a smart watch, fitness band, or the like) having a sensor suite that is capable of detecting the position of a user's extremity (e.g., hand, wrist, finger) in which the wearable computing device is worn. Based on the position of the user's extremity, an object selection component of the wearable computing device may identify a matrix cell corresponding to the extremity position, and may select an object corresponding to the matrix cell. In an aspect of the invention, objects may be scrolled through a menu based on the position of a user's extremity (e.g., the user's wrist). For example, the user may rotate their wrist to scroll through objects in a menu, and may tilt the wrist to select an object. In this way, object may be selected without the use of a touch-screen which can be inaccurate when the touch screen is relatively small. Also, an object may be selected without requiring the user to interact with a companion device (e.g., a smart phone, tablet, etc.) paired to the wearable device.

As described herein, an object may include an application, a function, a character, or pre-defined sequence of characters (e.g., words, phrases, sentences). An object may be selected to execute a function on the wearable device and/or on a paired companion device. For example, selection of the object may execute an application on the companion device (e.g., to place a call, begin playback of music, send a text message, etc.). Additionally, or alternatively, selection of an object may direct the companion device to perform a task (e.g., adjust the playback volume of music, skip or replay a music track, answer or place a telephone call, send a text message with a pre-defined phrase or sentence, and/or perform some other task). Advantageously, applications and functions may be executed and text may be inputted without the need to select the objects on a touch screen of the wearable device or on a companion device. This can be of particular usefulness to provide hands-free operation of the wearable computing device and/or a paired companion device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
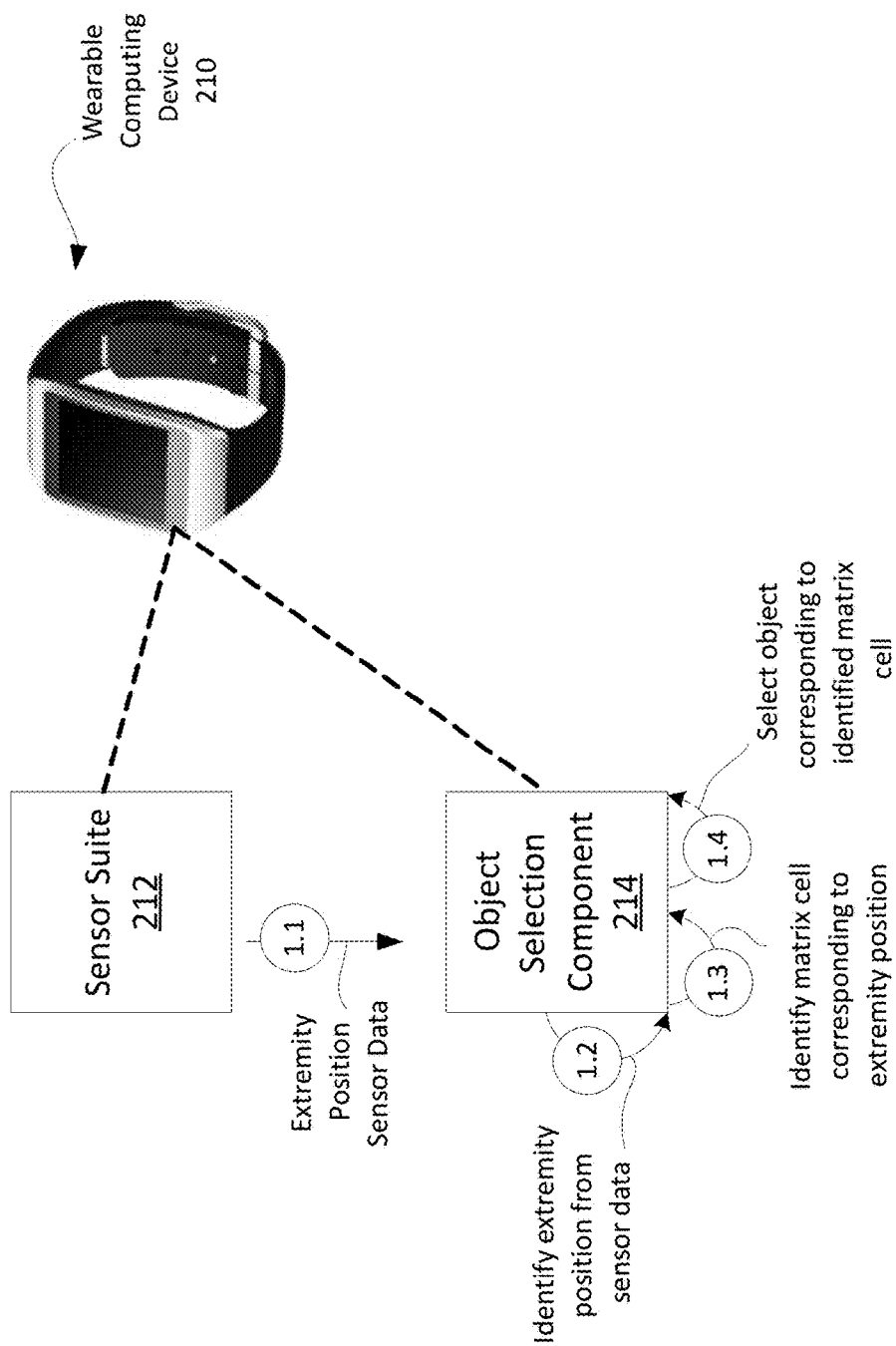
FIG. 2 shows an overview of an example implementation in accordance with aspects of the present invention

FIG. 2 shows an overview of an example implementation in accordance with aspects of the present invention. As shown in FIG. 2, a wearable computing device 210 may include a sensor suite 212 and an object selection component 214. The sensor suite 212 may include one or more sensors, accelerometers, gyroscopes, and/or other devices that may collect sensor data relating to the position of a user's extremity (e.g., hand, wrist, finger positions, etc.) via which the wearable computing device 210 is worn. At step 1.1, the sensor suite 212 may provide extremity position sensor data the object selection component 214. The object selection component 214 may continuously monitor the sensor data throughout the processes described herein. At step 1.2, the object selection component 214 may identify an extremely position from the sensor data. As described herein, the extremity position may include the position of a particular finger (e.g., an extended upward position, an extended downward position, an extended straight position, etc.).

At step 1.3, the object selection component 214 may identify a matrix cell corresponding to the extremity position. In an example embodiment, and as described in greater detail below with respects to FIGS. 3 and 4, a finger may correspond to a column in the matrix and a position of the finger may correspond to a row in the matrix (e.g., an extended upward position, an extended downward position, an extended straight position, etc.). Thus, when a first finger is moved to a first position, an object corresponding to Row 1, Column 1 in the matrix may be identified. Similarly, when a second finger is moved to a second position, an object corresponding to Row 2, Column 2 in the matrix may be identified. As an illustrative example, a 3×3 matrix may be implemented, although another size may also be used as defined by a user. In embodiments, the objects corresponding to matrix cells may be defined and customized by the user.

At step 1.4, the identified object corresponding to the identified matrix cell may be selected. In embodiments, the object may be selected after the gesture (e.g., extremity position) has been held for a threshold period of time. Additionally, or alternatively, the object may be selected after detecting a subsequent gesture or extremity position (e.g., tilting/rotating of the wrist, etc.). As described herein, selection of an object may execute an application or instruction on the wearable computing device 210 or on a paired companion device. For example, selection of the object may execute an application on the companion device (e.g., to place a call, begin playback of music, send a text message, etc.).

In embodiments, the object selection component 214 may begin to select an object based on extremity position after detecting a "wake" gesture or a "start" gesture (e.g., a predefined gesture, such as a shaking of the wrist or other gesture). In embodiments, the object selection component 214 may begin the object selection process after detecting the wake or start gesture in order to prevent inadvertent selections of objects.

In embodiments, a matrix of objects may be displayed on the wearable computing device 210 and objects may be highlighted based on the extremity position. Subsequently, the user may select a highlighted object using a subsequent gesture, or by holding the gesture for a threshold period of time. Alternatively, the matrix of objects may not necessarily be displayed on the wearable computing device 210 and objects may be selected without the need to display the matrix.

Figure 3:
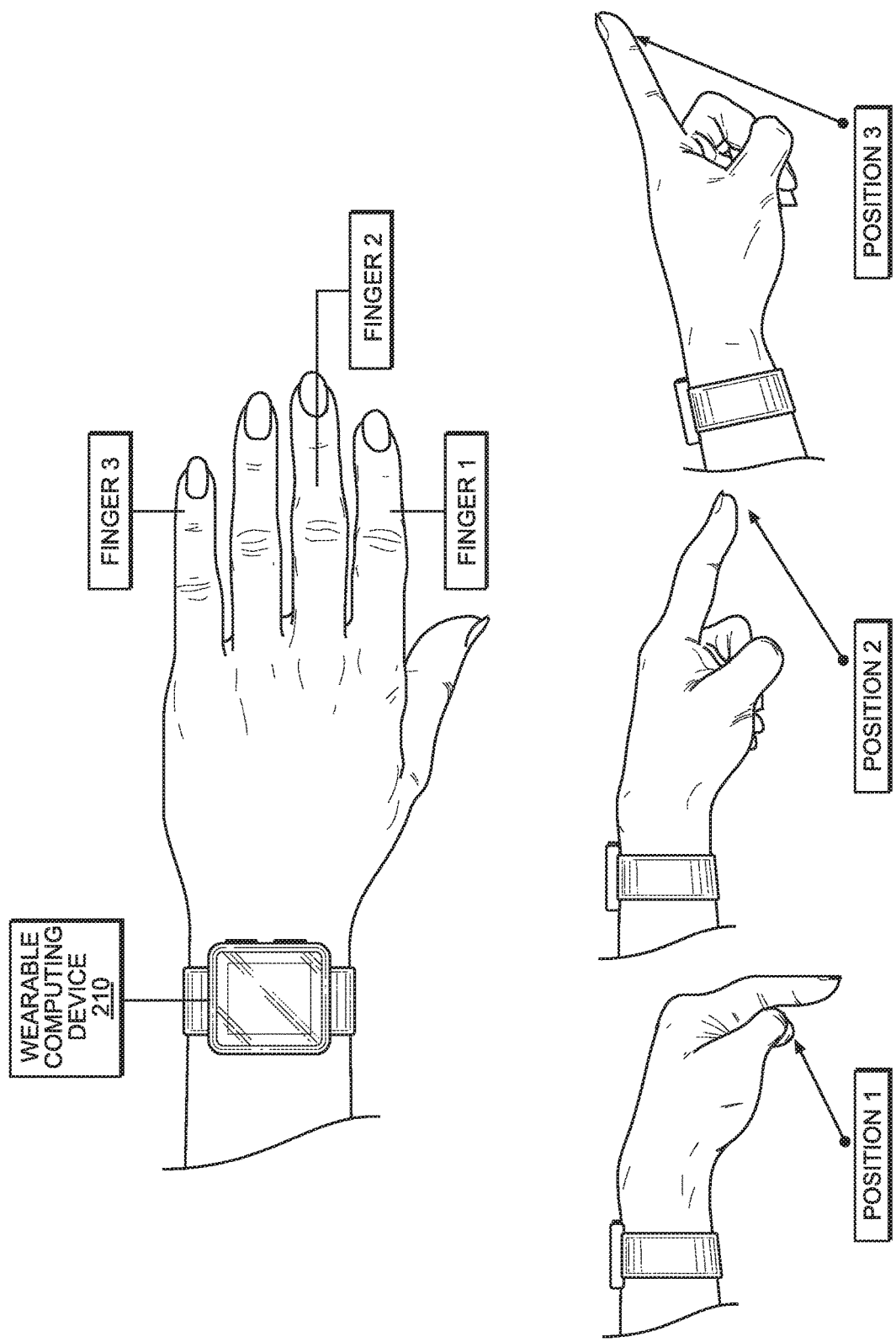
FIG. 3 shows an example of extremity positions/gestures that may be used to select an object on a wearable computing device without the need for touch selection of the object on the display of the wearable computing device in accordance with aspects of the present invention.

FIG. 3 shows an example of extremity positions/gestures that may be used to select an object on a wearable computing device without the need for touch selection of the object on the display of the wearable computing device. As shown in FIG. 3, the user's fingers may be designated with identifiers in the manner shown, although other designations may be defined. Also, identifiers may be defined for different finger positions (e.g., downward position, upward position, straight position). In the example shown, an index finger may be designated as finger 1, and a downward finger position may be designated as position 1. As described herein, an application on a companion device (e.g., a desktop, laptop, tablet, smartphone and/or other similar device) may be used to designate identifiers for different fingers and different finger positions. The companion device, via the application, may provide extremity position definitions to the wearable computing device 210.

FIG. 4 shows an example matrix of objects from which objects may be selected via extremity position gestures in accordance with aspects of the present invention. As shown in FIG. 4, a 3×3 matrix may be defined such that each of three fingers corresponds to a column in the matrix, and each of three finger positions corresponds to a row in the matrix. In embodiments, the matrix may be displayed on the wearable computing device 210 and an object may be highlighted based on the extremity position (e.g., the position of a particular finger). In the example shown in FIG. 4, "Object 1" may be highlighted when finger 1 is moved to position 1 (e.g., as described above with respect to FIG. 3). The highlighted object may be selected based on a subsequent extremity gesture (e.g., tilting or rotating of the wrist). Additionally, or alternatively, the highlighted object may be selected when the original gesture is held for a threshold period of time. In embodiments, a particular gesture or other user input may be used to activate or display the matrix on the wearable computing device 210. Alternatively, the matrix may not be displayed on the wearable computing device 210 and objects may be selected even when the matrix is not displayed (e.g., a non-visual matrix implementation). As described herein, an application on a companion device may be used to designate objects for different matrix cells.

Figure 5:
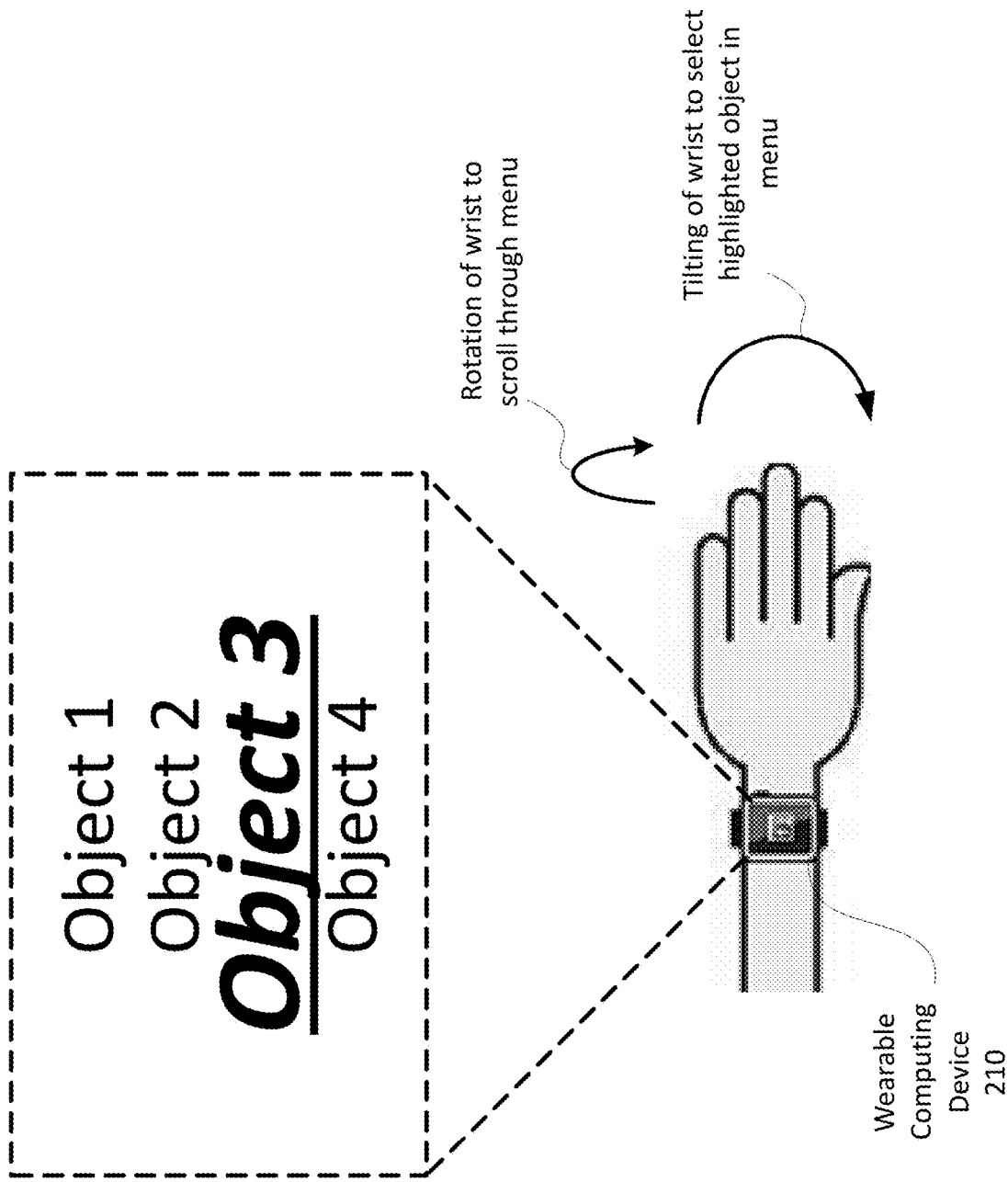
FIG. 5 shows an example implementation of selecting objects from a menu using wrist tilt and rotation gestures in accordance with aspects of the present invention.

FIG. 5 shows an example implementation of selecting objects from a menu using wrist tilt and rotation gestures in accordance with aspects of the present invention. As shown in FIG. 5, rotation gestures may be used to scroll through objects presented in a menu. For example, the wearable computing device 210 may detect a rotation gesture based on the sensor data gathered by the sensor suite 212 of the wearable computing device 210 (e.g., from a gyroscope included in the sensor suite 212). Based on the rotation gesture, objects within the menu or list are scrolled through and highlighted (e.g., with enlarged text, etc.). A highlighted or current object can be selected, for example, based on receiving a subsequent gesture (e.g., a tilting of the wrist as detected via sensor data gathered by the sensor suite 212). As an illustrative example, a menu may be presented to allow the user to select playlist/tracks for audio playback. Additionally, or alternatively, the menu may present a list of applications to open, and/or a list of pre-defined phrases (e.g., for quick responses to text messages).

In embodiments different matrices and different menus with different objects may be active based on a current function or application running and/or in the foreground on the wearable computing device 210. For example, when a music application is running on the wearable computing device 210, a visual matrix, non-visual matrix, or menu having objects relating to music functions may be active (e.g., a matrix or menu having instructions to change a track, playlist, adjust volume, etc.). When a texting application is running on the wearable computing device 210, a visual matrix, non-visual matrix, or menu having objects relating to texting functions may be active (e.g., a matrix or menu having pre-defined text messages, replies, etc.). When no applications are in the foreground, a visual matrix, non-visual matrix, or menu having objects relating launching applications may be active. In embodiments, selection of an object in a matrix may subsequently present a menu on the wearable computing device 210. A companion device may be used to define which matrices, menus, and/or objects are to be used based on the application currently being used or in the foreground of the wearable computing device 210 and/or the companion device.

Figure 6:
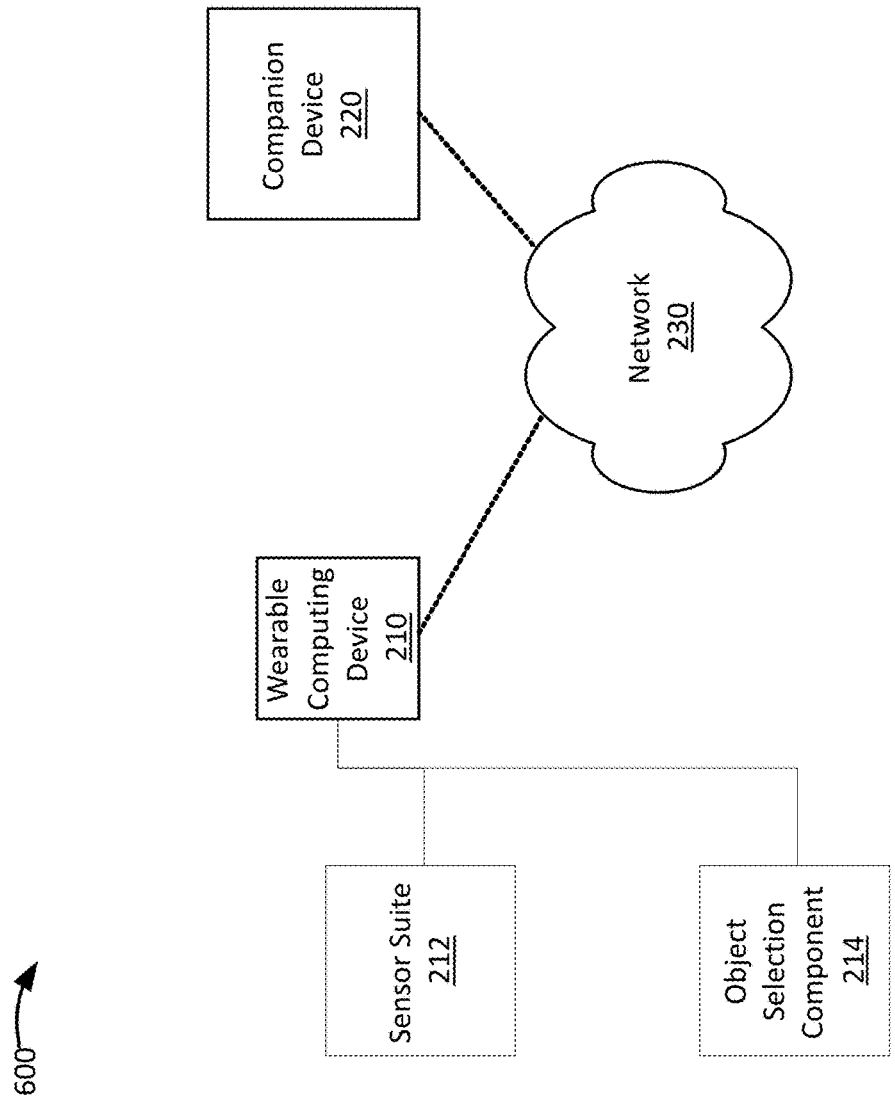
FIG. 6 shows an example environment in accordance with aspects of the present invention.

FIG. 6 shows an example environment in accordance with aspects of the present invention. As shown in FIG. 6, environment 600 may include a wearable computing device 210, a companion device 220, and network 230. In embodiments, one or more components in environment 600 may include the components of computer system/server 12 of FIG. 1.

The wearable computing device 210 may include a smart watch, smart fitness band, and/or other type of wearable computing device. As described herein, the wearable computing device 210 may include a sensor suite 212. The sensor suite 212 may include one or more sensors, such as accelerometers, gyroscopes, and/or other devices that may collect sensor data relating to the position of a user's extremity (e.g., hand, wrist, finger positions, etc.) via which the wearable computing device 210 is worn. The object selection component 214 may include a one or more program modules (e.g., program modules 42 of FIG. 1) that monitors sensor data obtained by the sensor suite 212 and detects the position of the user's extremity based on the sensor data. The object selection component 214 may perform an action based on the extremity position and/or other extremity gestures. For example, as described herein, the object selection component 214 may select an object corresponding to a matrix cell associated with the position of the user's finger. Additionally, or alternatively, the object selection component 214 may scroll through objects in a menu based on the user's wrist gestures. The object selection component 214 may send command instructions to a paired companion device 220 to launch an application and/or perform a task on the companion device 220 based on the selection of an object or the detection of an extremity gesture.

The companion device 220 may include a device capable of communicating via a network, such as the network 230. For example, the companion device 220 may correspond to a mobile communication device (e.g., a smart phone or a personal digital assistant (PDA)), a portable computer device (e.g., a laptop or a tablet computer), or another type of device. In some embodiments, the companion device 220 may be paired with the wearable computing device 210 (e.g., to receive command instructions from the wearable computing device 210 to perform a task, launch an application, etc.). For example, the companion device 220 may be paired with the wearable computing device 210 via a Personal Area Network (PAN), such as BLUETOOTH network or connection. Additionally, or alternatively, the companion device 220 may be paired with the wearable computing device 210 via a Near Field Communications (NFC) network or connection.

The companion device 220 may be used to customize a matrix of objects for selection via the wearable computing device 210. For example, the companion device 220 may be used to customize objects that are part of a matrix, such as the example matrix shown in FIG. 4. Additionally, or alternatively, the companion device 220 may be used to customize other settings regarding the actions performed by the wearable computing device 210 based on different extremity positions and gestures. For example, the companion device 220 may be used to define fingers and finger positions that correspond to cells in a matrix. Additionally, or alternatively, the companion device 220 may be used to define different actions to perform based on different extremity gestures and based on applications/tasks currently running on a foreground of the wearable computing device 210 and/or the companion device 220.

The network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 235 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, a Personal Area Network (e.g., BLUETOOTH network), a Near-Field Communications (NFC) network, and/or a combination of these or other types of networks.

The quantity of devices and/or networks in the environment 600 is not limited to what is shown in FIG. 6. In practice, the environment 600 may include additional devices and/or networks; fewer devices and/or networks; different devices and/or networks; or differently arranged devices and/or networks than illustrated in FIG. 6. Also, in some implementations, one or more of the devices of the environment 600 may perform one or more functions described as being performed by another one or more of the devices of the environment 600. Devices of the environment 600 may interconnect via wired connections, wireless connections, or a combination of wired and wireless connections.

Figure 7:
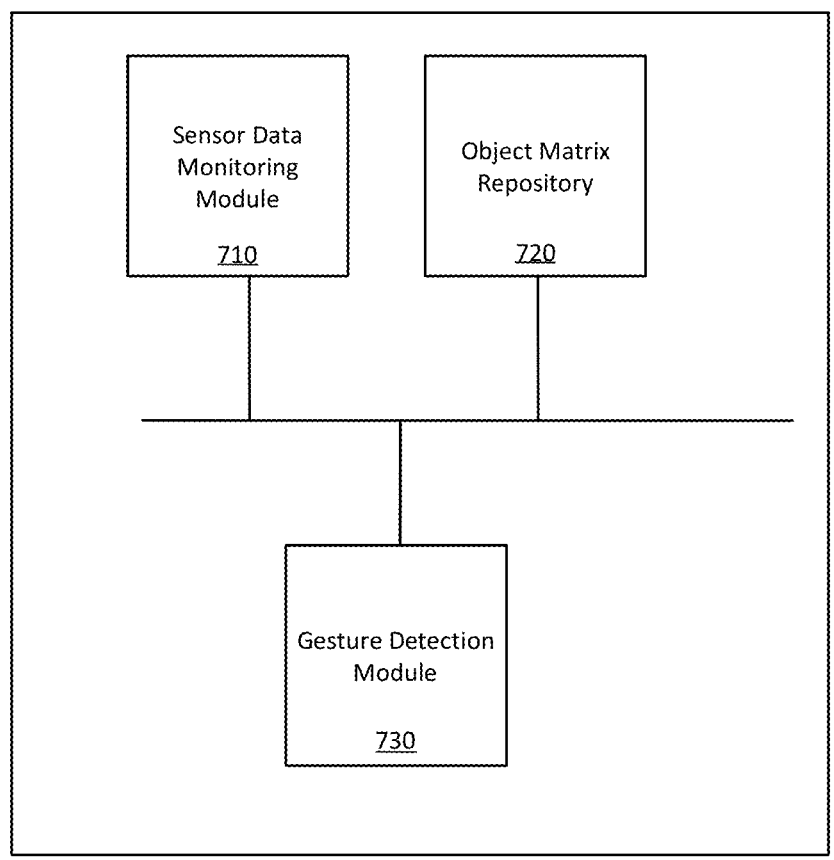
FIG. 7 shows a block diagram of example components of an object selection component in accordance with aspects of the present invention.

FIG. 7 shows a block diagram of example components of an object selection component in accordance with aspects of the present invention. As shown in FIG. 7, the object selection component 214 may include a sensor data monitoring module 710, a object matrix repository 720, and a gesture detection module 730. In embodiments, the object selection component 214 may include additional or fewer components than those shown in FIG. 7. In embodiments, separate components may be integrated into a single computing component or module. Additionally, or alternatively, a single component may be implemented as multiple computing components or modules.

The sensor data monitoring module 710 may include a data program module (e.g., program module 42 of FIG. 1) that receives and monitors sensor data received from the sensor suite 212. For example, the sensor data monitoring module 710 may continuously receive and monitor sensor data relating to the position of a user's extremity and/or the user's extremity gestures. Specifically, the sensor data monitoring module 710 may receive accelerometer sensor data, gyroscope sensor data, and/or other sensor data from the sensor suite 212.

The object matrix repository 720 may include a data storage device (e.g., storage system 34 of FIG. 1) that stores information identifying one or more matrices to be used to select objects based on user extremity position/gestures. For example, the object matrix repository 720 may store information identifying objects in a matrix (e.g., a 3×3 matrix). Further, the object matrix repository 720 may store information identifying cells in the matrix corresponding to each object. Additionally, or alternatively, the object matrix repository 720 may store information identifying extremity positions/gestures corresponding to each cell. As an illustrative example, the object matrix repository 720 may store information identifying that an index finger in an upright position corresponds to the object in row 1, column 1 of the matrix. The object matrix repository 720 may store multiple matrices with each matrix being associated with a particular application of the wearable computing device 210 and/or companion device 220. Additionally, or alternatively, the object matrix repository 720 may store a menu or list having objects. Further, object matrix repository 720 may store a different menu or list of objects for different applications (e.g., a list of songs or playlists for a music application, and a list of predetermined words or phrases or a texting application).

The gesture detection module 730 may include a data program module (e.g., program module 42 of FIG. 1) that detects an extremity gesture and/or extremity position based on sensor data monitored by the sensor data monitoring module 710. In embodiments, the gesture detection module 730 may store sensor measurements and values corresponding to extremity position. For example, the gesture detection module 730 may store a set of sensor measurements and values that correspond to different fingers being in different positions. As an illustrative example, the gesture detection module 730 may store a dataset identifying sensor data values corresponding to the user's index finger being in an upright position. Similarly, the gesture detection module 730 may store other datasets identifying sensor data values corresponding to other fingers of the user being in other positions. In embodiments, the datasets may be "trained" to the gesture detection module 730 using a training process (e.g., a process in which the user is instructed by the wearable computing device 210 to produce different extremity positions and gestures at which time the gesture detection module 730 stores sensor data corresponding to the different extremity positions). Additionally, or alternatively, the datasets may be preloaded based on experimental or known data indicating the extremity position. The gesture detection module 730 may identify an extremity position by comparing real-time monitored sensor data to stored datasets indicating the extremity position.

The gesture detection module 730 may map the detected gesture to a task. Specifically, the gesture detection module 730 may map values of the sensor data (e.g., representing a detected gesture) to an object corresponding to matrix cell based on a matrix stored by the object matrix repository 720. For example, the gesture detection module 730 may detect that an index finger has been moved to an upright position (e.g., based on comparing sensor data with values in a dataset indicating the index finger in the upright position. Accordingly, the gesture detection module 730 may select an object corresponding to row 1, column 1 of a matrix (e.g., based on the object matrix repository 720 storing information indicating that an index finger in an upright position corresponds to row 1, column 1). Additionally, or alternatively, the gesture detection module 730 may detect a rotation of the user's wrist and scroll through objects in a menu or list displayed on the wearable computing device 210. Subsequently, the gesture detection module 730 may detect a tilting of the user's wrist to select a current object in the list. As described herein, selection of an object may direct the wearable computing device 210 to perform a task, such as launch an application, send a text message, play music, change a music track/playlist, etc. Additionally, or alternatively, the selection of the object may send an instruction to a paired companion device 220 to perform the task.

In embodiments, the gesture detection module 730 may begin to detect extremity position and gestures based on receiving a "wake" gesture, object selection gesture, or menu scrolling gesture, (e.g., to prevent the inadvertent selection of objects or the execution of tasks). In embodiments, the wake gesture may be customized, and may be, for example, the shaking the user's wrist for a threshold period of time. In embodiments, the gesture detection module 730 may select an object in a matrix when an extremity position has been held for a threshold period of time to prevent an inadvertent selection of an object.

Figure 8:
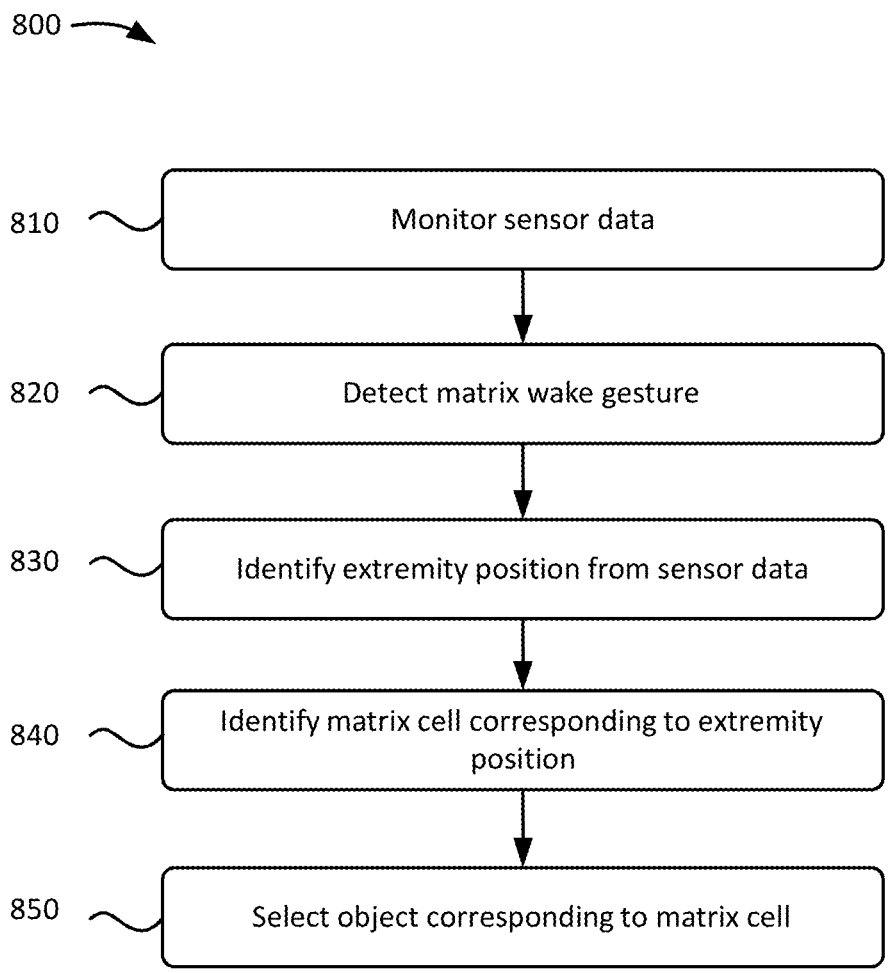
FIG. 8 shows an example flowchart of a process for selecting an object corresponding to a matrix cell in accordance with aspects of the present invention.

FIG. 8 shows an example flowchart of a process for selecting an object corresponding to a matrix cell in accordance with aspects of the present invention. The steps of FIG. 8 may be implemented in the environment of FIG. 6, for example, and are described using reference numbers of elements depicted in FIG. 6. As noted above, the flowchart illustrates the architecture, functionality, and operation of possible implementations of systems, methods, and computer program products according to various embodiments of the present invention.

As shown in FIG. 8, process 800 may include monitoring sensor data (step 810). For example, as described above with respect to the sensor data monitoring module 710, the object selection component 214 may continuously receive and monitor sensor data relating to the position of a user's extremity and/or the user's extremity gestures. Specifically, the object selection component 214 may receive accelerometer sensor data, gyroscope sensor data, and/or other sensor data from the sensor suite 212. As described herein, the object selection component 214 may monitor sensor data throughout process 800.

Process 800 may further include detecting a matrix wake gesture (step 820). For example, as described above with respect to the gesture detection module 730, the object selection component 214 may detect a matrix wake gesture. As described herein, the matrix wake gesture may be the shaking of the user's wrist and/or other customizable gesture that is detected based on monitoring the sensor data. The matrix wake gesture may trigger the object selection component 214 to begin monitoring sensor data for detecting extremity position. In embodiments, the matrix wake gesture may direct the object selection component 214 to display a matrix of objects on the wearable computing device 210, although in some embodiments, the matrix may not need to be displayed. As described later in FIG. 9, a wake gesture may trigger object selection component 214 to display objects in a menu rather than in a matrix.

Process 800 may also include identifying extremity position from the sensor data (step 830). For example, as described above with respect to the gesture detection module 730, the object selection component 214 may identify an extremity position from the sensor data (e.g., by comparing the monitored sensor data to stored datasets indicating the extremity position). As an example, the object selection component 214 may determine that the user's index finger is in an upright position.

Process 800 may further include identifying a matrix cell corresponding to the extremity position (step 840). For example, as described above with respect to the gesture detection module 730, the object selection component 214 may identify a matrix cell corresponding to the extremity position (e.g., based on a matrix stored by the object matrix repository 720). As an example, the object selection component 214 may identify a row and column in the matrix based on a position of a particular finger.

Process 800 may also include selecting an object corresponding to the matrix cell (step 850). For example, as described above with respect to the gesture detection module 730, the object selection component 214 may select an object corresponding to the matrix cell. In embodiments, the gesture detection module 730 may select an object from a particular matrix of multiple matrices. As described herein, the particular matrix may be based on an active application or task running in a foreground of the wearable computing device 210 and/or a paired companion device 220.

Figure 9:
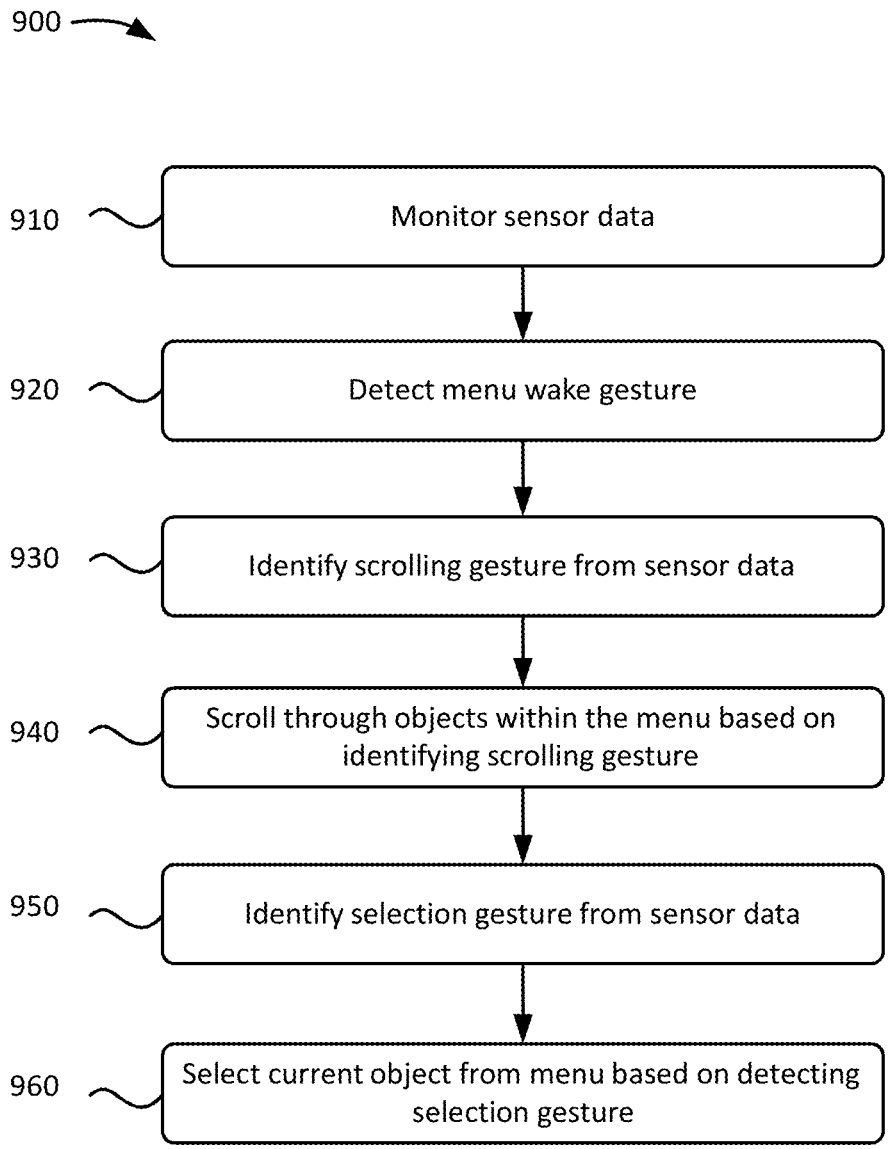
FIG. 9 shows an example flowchart of a process for scrolling through objects in a menu using extremity gestures in accordance with aspects of the present invention.

FIG. 9 shows an example flowchart of a process for scrolling through objects in a menu using extremity gestures in accordance with aspects of the present invention. The steps of FIG. 9 may be implemented in the environment of FIG. 6, for example, and are described using reference numbers of elements depicted in FIG. 6. As noted above, the flowchart illustrates the architecture, functionality, and operation of possible implementations of systems, methods, and computer program products according to various embodiments of the present invention.

As shown in FIG. 9, process 900 may include monitoring sensor data (step 910). For example, as described above with respect to the sensor data monitoring module 710, the object selection component 214 may continuously receive and monitor sensor data relating to the position of a user's extremity and/or the user's extremity gestures. As described herein, the object selection component 214 may monitor sensor data throughout process 900.

Process 900 may further include detecting a menu wake gesture (step 920). For example, as described above with respect to the gesture detection module 730, the object selection component 214 may detect a menu wake gesture. As described herein, the menu wake gesture may be the shaking of the user's wrist and/or other customizable gesture that is detected based on monitoring the sensor data. The menu scrolling gesture may trigger the object selection component 214 to display a menu of objects and begin monitoring sensor data for detecting extremity position. In embodiments, the menu wake gesture may direct the object selection component 214 to display a menu rather than a matrix (e.g., when the active application on the wearable computing device 210 and/or a paired companion device 220 is associated with a menu instead of a matrix). In embodiments, a menu may be displayed after selecting an object within a matrix in accordance with process 800.

Process 900 may also include identifying scrolling gesture from the sensor data (step 930). For example, as described above with respect to the gesture detection module 730, the object selection component 214 may detect a scrolling gesture, such as a rotation of the user's wrist. Process 900 may also include scrolling through objects within the menu based on identifying the scrolling gesture (step 940). For example, the object selection component 214 may scroll through the objects in the menu and may update the display of the menu as objects are being scrolled. A current object may be highlighted or otherwise differentiated from other objects in the menu. As an illustrative example, the objects in a menu may be a list of pre-defined phrases or sentences (e.g., for quickly replying to text messages). Additionally, or alternatively, the objects may be a list of songs, or a list of applications to launch.

Process 900 may further include identifying a selection gesture from the sensor data (step 950). For example, the object selection component 214 may detect a selection gesture, such as the tilting of the user's wrist, or another gesture that may be customized and defined as a selection gesture. Process 900 may also include selecting current object from the menu based on detecting the selection gesture (step 960). For example, the object selection component 214 may select a current object from the menu based on detecting the selection gesture.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
displaying, by a wearable computing device, a matrix of cells aligned in columns and rows, wherein each of the columns is assigned a particular finger of a user and each of the rows is assigned a particular finger position of the user, wherein the matrix of cells comprises a menu, and wherein each cell corresponds to a selectable menu object that can be selected based on one of the particular fingers of the user and one of the particular finger positions of the user;
identifying, by the wearable computing device, a gesture of the user including identifying one of a plurality of fingers engaged in the gesture and a position of the one of the plurality of fingers of the user wearing the wearable computing device, wherein the identifying is based on monitoring sensor data gathered by a sensor suit implemented by the wearable computing device;
identifying, by the wearable computing device, a cell of the displayed matrix of cells that corresponds to the one of the plurality of fingers and the position of the one of the plurality of fingers of the user;
highlighting, by the wearable computing device, the cell of the displayed matrix of cells based on the identifying the cell of the matrix of cells;
determining, by the wearable computing device, that the gesture of the user has been held for a predetermine threshold period of time; and
selecting, by the wearable computing device, an object that corresponds to the identified cell of the displayed matrix of cells based on the gesture of the user being held for the threshold period of time.

2. The method of claim 1, wherein the identifying the position of the one of the plurality of fingers of the user includes comparing the sensor data to a dataset identifying the position of the one of the plurality of fingers of the user.

3. The method of claim 1, wherein the sensor data includes at least one selected from a group consisting of:
accelerometer data; and
gyroscope data.

4. The method of claim 1, further comprising detecting a wake gesture based on the monitoring the sensor data, wherein the identifying the position of the one of the plurality of fingers of the user is based on detecting the wake gesture.

5. The method of claim 4, wherein the wake gesture includes detecting sensor data that is consistent with the user shaking a wrist via which the wearable computing device is worn.

6. The method of claim 1, wherein the matrix of cells is one of a plurality of matrices stored on the wearable computing device, each of the matrices being associated with a menu of an application or task and each including different menu objects, the method further comprising activating, by the wearable computing device, the matrix of cells based on the application or task associated with the matrix of cells being active.

7. The method of claim 6, further comprising:
activating, by the wearable computing device, a second matrix of cells of the plurality of matrices based on a second application or task associated with the second matrix of cells being active;
displaying, by the wearable computing device, the second matrix of cells, wherein the second matrix of cells comprises objects different from those of the matrix of cells;
identifying, by the wearable computing device, a subsequent gesture of the user including identifying one of the plurality of fingers engaged in the subsequent gesture and a subsequent position of the one of the plurality of fingers of the user wearing the wearable computing device, wherein the identifying is based on monitoring sensor data gathered by the sensor suit implemented by the wearable computing device;
identifying, by the wearable computing device, a cell of the displayed second matrix of cells that corresponds to the one of the plurality of fingers and the subsequent position of the one of the plurality of fingers of the user;
highlighting, by the wearable computing device, the cell of the displayed second matrix of cells based on the identifying the cell of the second matrix of cells;
determining, by the wearable computing device, that the subsequent gesture of the user has been held for a subsequent predetermine threshold period of time; and
selecting, by the wearable computing device, an object that corresponds to the identified cell of the displayed second matrix of cells based on the subsequent gesture of the user being held for the threshold period of time.

8. The method of claim 1, wherein the selecting the object includes at least one selected from the group consisting of:
executing an application or task;
entering of predefined string of characters;
adjusting of volume controls;
skipping audio playback; and
placing or answering of a telephone call.

9. The method of claim 1, wherein the selecting the object directs the wearable computing device to present another menu of additional objects, the method further comprising:
detecting a scrolling gesture;
scrolling through the additional objects in the other menu based on detecting the scrolling gesture;
detecting a selection gesture; and
selecting a current object in the other menu based on the detecting the selection gesture.

10. The method of claim 9 wherein the detecting the scrolling gesture includes detecting a rotation of the user's wrist and the detecting the selection gesture includes detecting a tilting of the user's wrist.

11. The method of claim 1, wherein a service provider at least one of creates, maintains, deploys and supports the computing device.

12. The method of claim 1, further comprising defining, by the wearable computing device, the objects in the matrix of cells based on user input.

13. A computer program product for selecting a plurality of objects on a wearable computing device without touch inputs, the computer program product comprising a computer readable storage medium having program instructions embodied therewith, the program instructions executable by the wearable computing device to cause the wearable computing device to:
display a menu comprised of a matrix of selectable cells, wherein the matrix has a first axis of assigned finger positions and a second axis of assigned fingers of a user, and wherein each cell corresponds to a selectable menu object that can be selected based on one of the assigned fingers of the user and one of the assigned finger positions of the user;
identify a gesture of the user including identifying one of a plurality of fingers engaged in the gesture and a position of the one of the plurality of fingers of the user wearing the wearable computing device, wherein the identifying is based on monitoring sensor data gathered by a sensor suite implemented by the wearable computing device;
identify a cell of the displayed matrix of selectable cells that corresponds to the one of the plurality of fingers and the position of the one of the plurality of fingers of the user;
highlight the cell of the displayed matrix of selectable cells based on the identifying the cell of the displayed matrix of selectable cells;
determine that the gesture of the user has been held for a predetermine threshold period of time; and
select an object that corresponds to the cell of the displayed matrix of selectable cells based on the gesture of the user being held for the threshold period of time.

14. The computer program product of claim 13, wherein the sensor data includes at least one selected from a group consisting of:
accelerometer data; and
gyroscope data.

15. The computer program product of claim 13, wherein the program instructions further cause the wearable computing device to detect a wake gesture based on the monitoring the sensor data, wherein the identifying the cell of the displayed matrix of selectable cells is based on detecting the wake gesture.

16. The computer program product of claim 15, wherein the detecting the wake gesture includes detecting sensor data that is consistent with the user shaking a wrist on which the wearable computing device is worn.

17. The computer program product of claim 13, wherein the matrix of selectable cells is one of a plurality of menus in the form of matrices of selectable cells stored on the wearable computing device, each of the menus being associated with an application or task and each including different menu objects, the program instructions further executable to cause the wearable computing device to activate the matrix of selectable cells from the plurality of matrices based on the application or task associated with the matrix of selectable cells being active.

18. A system comprising:
a CPU, a computer readable memory and a computer readable storage medium associated with a wearable computing device;

program instructions to detect a wake gesture based on monitoring sensor data gathered by a sensor suite implemented by the wearable computing device;

program instructions to display a matrix of selectable cells aligned in columns and rows based on the detecting the wake gesture, wherein each of the columns is assigned a particular finger position of a user and each of the rows is assigned a particular finger of the user, and wherein each of the selectable cells corresponds to an object that can be selected based on a unique combination of one of the particular fingers of the user and one of the particular finger positions of the user;

program instructions to detect a selection gesture based on the monitoring the sensor data, wherein the select gesture includes a select one of a plurality of fingers of the user and a select one of a plurality of positions of the finger of the user; and program instructions to identify a cell of the displayed matrix of selectable cells that corresponds to the select one of a plurality of fingers of the user and the select one of a plurality of positions of the finger of the user;

program instructions to highlight the cell of the displayed matrix of selectable cells based on the identifying the cell of the matrix of selectable cells;

program instructions to determine that the gesture of the user has been held for a predetermine threshold period of time; and program instructions to select an object associated with the cell of the displayed matrix of selectable cells based on the determining that the gesture of the user has been held for the predetermined threshold period of time, wherein the program instructions are stored on the computer readable storage medium for execution by the CPU via the computer readable memory.

19. The system of claim 18, wherein:

the matrix of selectable cells is one of a plurality of matrices stored on the wearable computing device, each of the matrices being associated with an application or task and each including different objects; and the system further comprises program instructions to activate the matrix of selectable cells from the plurality of matrices based on the application or task associated with the matrix of selectable cells being active.

20. The system of claim 18, further comprising program instructions do define the objects in the matrix of selectable cells based on user input.

\* \* \* \* \*